Nov. 1, 1955 H. D. HIMES 2,722,599

MULTI-ELEMENT RADIATION SHIELD

Filed April 28, 1951

INVENTOR.
HAROLD D. HIMES.
BY
Alden D. Redfield.
ATTORNEY.

1

2,722,599

MULTI-ELEMENT RADIATION SHIELD

Harold D. Himes, Cincinnati, Ohio, assignor to Avco Manufacturing Corporation, Cincinnati, Ohio, a corporation of Delaware Application April 28, 1951, Serial No. 223,485

1 Claim. (Cl. 250—16)

Figures 1, 4:
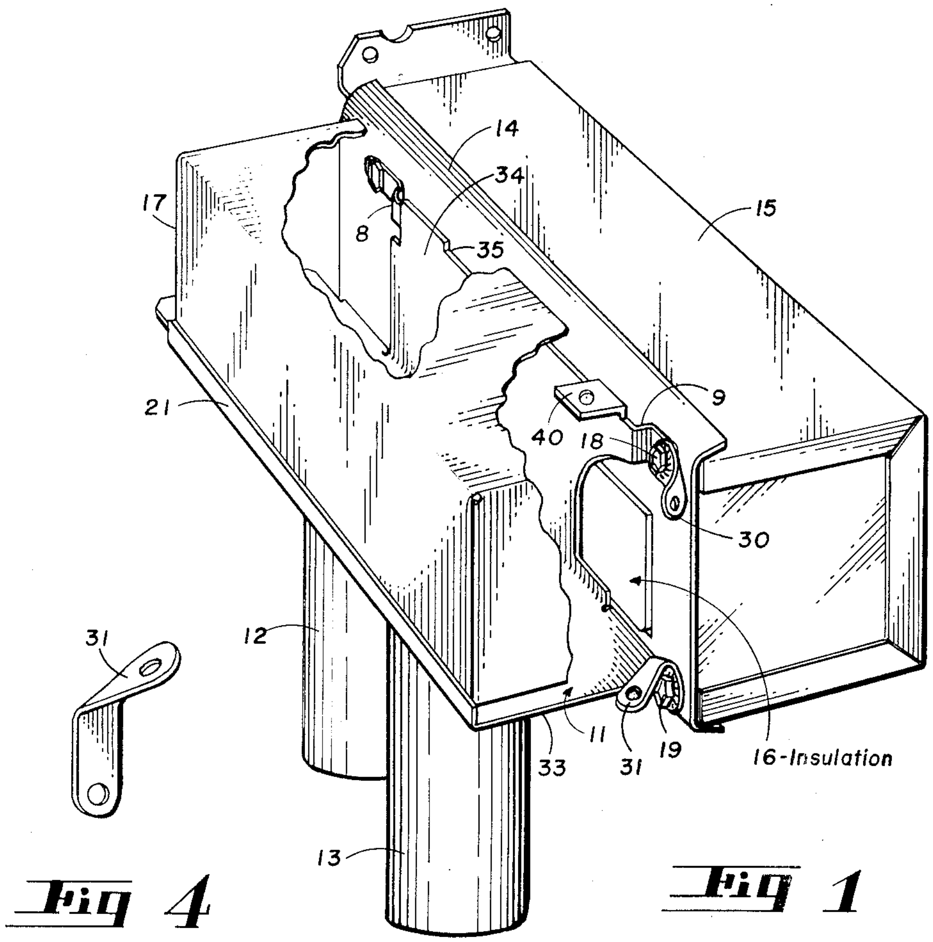

This invention relates in general to a shield structure for confining electrostatic and magnetic fields to a restricted space. More specifically, this invention relates to means for joining separate portions of a multi-element shield structure.

The almost universal application of the superheterodyne principle to high frequency and ultra-high frequency receivers, e. g., television receivers, makes limitation of local oscillator radiation a problem of prime importance, because radiation from such a receiver is bound to interfere with other receivers located nearby. The Federal Communications Commission, being acutely conscious of the problem, has promulgated rules and regulations for establishing what might be called a "good neighbor" policy of receiver radiation, setting maximum allowable limits which greatly decrease neighborhood interference. As a result television receiver manufacturers pay considerable attention to practical ways and means of reducing undesired energy radiation.

The most effective means for containing radiant fields at radio and higher frequencies, is to confine the fields to a restricted space surrounding its source. This can be accomplished by providing a metallic, electrical conductive container, formed to surround the radiating source. To be most effective, such shields should completely surround the offending source and if joints are necessary in the shielding material they should have a tight mechanical fit and be soldered if possible. Such a shield will act to confine practically all of the magnetic field to the space within the metal enclosure because as the flux attempts to cut into the conducting material it produces eddy currents that oppose penetration. Though a watertight metallic container provides an excellent shield and a properly designed set of concentric watertight metallic containers provides a much better shield, practical considerations, from production and economy standpoints, have moved the television industry toward a compromise between optimum shielding and the amount of shielding necessary, according to FCC standards. Even so, the average shield structure currently in use requires costly parts and operations which generally result in making the various shielded components relatively inaccessible for service operations.

Therefore, it is an object of the present invention to provide means whereby an effective multi-element shield may be constructed without resorting to solder joints.

It is also an object of this invention to provide means for joining multi-element shield portions in such a manner as to minimize eddy current resonant loops in the shield structure at the frequency to be shielded against, thus minimizing energy transfer between the primary radiation source and space through antenna action of the metallic shield structure.

It is a further object of the present invention to provide means for making electrical contact between the various portions of a multi-element shield structure so as to minimize or eliminate standing waves in the shield material.

2

In addition, it is an object of the present invention to provide a multi-element shield structure which makes the shielded circuits relatively accessible and assures adequate shielding even though the structure is partially disassembled and assembly many times.

Further, it is an object of this invention to provide contacts between multi-element shield units which wipe into position so as to supply good electrical contact between multi-element shield portions which have relatively loose mechanical tolerances.

Briefly, in accordance with a particular form of the invention, I have provided a multi-element shield surrounding the circuit of a local oscillator in a television receiver tuner unit, and to electrically interconnect portions of the shield, I have provided resilient finger means, having low impedance at the shielding frequencies, which are mechanically connected at one end to a convenient point common to the shield portions and formed at their other end so as to wipe into place upon assembly against one edge of the shield portion to be contacted. The position of the wiping contact is critical and is selected by a testing procedure, which will be more exhaustively explained in the remainder of the disclosure.

Figure 2:
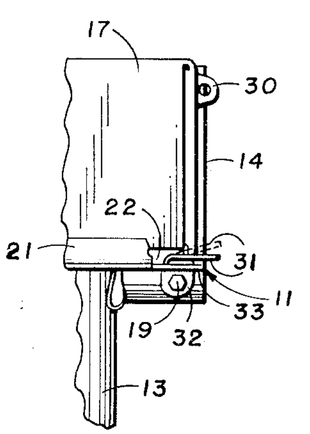
Figure 3:
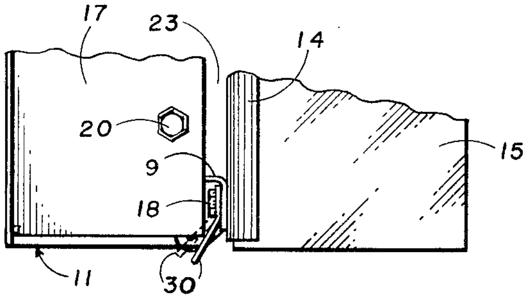

For a better understanding of the present invention, together with other and further objects, advantages and capabilities thereof, reference is made to the following disclosure and appended claim in connection with the accompanying drawings, in which:

Fig. 1 illustrates a preferred embodiment in the form of an assembled television tuner unit having multi-element shield portions electrically interconnected in accordance with my invention, Fig. 2 and Fig. 3 show a partial side view and top view, respectively, of the cut-away end of Fig. 1, better illustrating the wiping action of the resilient finger contact members, and Fig. 4 is an enlarged perspective view of one of the finger contact members.

Referring now to the structure illustrated in Fig. 1, I have shown, for explanatory purposes, a television receiver tuner chassis incorporating a multi-element shield. The horizontal portion 33 of oscillator chassis 11 supplies a foundation upon which the R. F. and mixer tube circuit as well as the oscillator tube circuit may be mounted. In this particular embodiment the R. F. and mixer tube is shown surrounded by a shield can 12 and the oscillator tube is shown surrounded by a shield can 13. The container formed by chassis 14 and cover 15 surrounds the variable inductance portion of the tuner circuit. Thus a portion of the oscillator tank circuit is surrounded by the container comprising chassis 14 and cover 15 and the remainder of the oscillator circuit is mounted on chassis 11. The leads between the two portions of the circuit are brought through ceramic or insulating blocks 16. The four sided enclosure 17 in conjunction with chassis 11 and chassis 14 acts to shield the tube circuit portion of the oscillator circuit. Chassis 11 has an L-shaped cross-section and, as shown in Fig. 1, provides not only a horizontal surface 33 which, at least in part, closes the lower opening of cover 17, but also a vertical surface 35 which lies in a plane parallel to the flat, vertical portion of U-shaped chassis 14 adjacent to the ceramic insulating block 16. The vertical portion of chassis is formed to provide feet 8, 9 or tabs along the upper edge. One of these tabs or feet 9, is secured to chassis 14 by bolt 18. One other tab, 8, also connecting the upper edge of chassis 11 and chassis 14, is revealed by the upper portion of cover 17 which is cut away. Chassis 14 is also attached to chassis 11 by tabs or feet, such as 32, formed from the horizontal portion 33 of the chassis 11 and bent into the vertical plane. One of these tabs 32, is shown as attached to chassis 14 by bolt 19 in both Fig. 1 and Fig. 2. In these figures it can be seen that bolt 19 first goes through a lock washer, then through a tab 32 formed from the horizontal portion of chassis 11, and then through the opening formed in resilient finger member 31. Fastening means such as bolts 18 and 19 rigidly connect the chassis 11 and 14 together so as to form a rigid tuner structure. A single fastening means such as a bolt or metal screw 20 fastens the shield portion 17 to tab 40 on chassis 11, as is best shown in Figs. 2 and 3. As will be seen this is the only fastening means which must be removed in order to take off shield portion 17 and make the tube circuits accessible for maintenance purposes.

The oscillator circuit in a television receiver, as has been stated, acts as a generator of very high frequency waves. These waves may be radiated in two ways, i. e., by direct inductive or electrostatic coupling and by antenna action arising from a standing wave condition on the shield element itself. The direct radiation, i. e., the direct inductive or electrostatic coupling, is for all practical purposes, effectively eliminated by ordinary shadow shielding provided by the metallic shield structure. However, if there are openings or breaks in the shield structure which act to disturb eddy current flow, in the shield material, set up by the enclosed changing magnetic field, high potentials in the form of standing waves may be set up along the edges of the shield portion which then acts as a radiating antenna. These mechanical discontinuities in the shield material, in other words, may supply eddy current conduction paths having sufficient inductance and capacitance to resonate at the oscillator frequency or a close harmonic thereof, and act as a means for transferring energy between the oscillator and the space outside of the shield. In the illustrated tuner unit, production problems forced such discontinuities to be incorporated in the shield.

Referring again to the drawings it can be seen that the cover 17 abuts chassis 11 along seam 21. This is the type of joint that must be tightly formed; otherwise, the induced eddy current paths will be disturbed sufficiently to set up a standing wave condition with resultant radiation. Also, referring to Fig. 2, it can be seen that cover 17 does not fit tightly against the upper surface of the horizontal portion of chassis 11, leaving a gap 22 between the edge of cover 17 and this surface of chassis 11. In addition, there is a gap 23, best shown in Fig. 3, formed between cover 17 and chassis 14 which tends to set up antenna action. In fact all of these discontinuities in the shield structure act as radiating surfaces of varying degree. Of course my invention is not to be understood as limited to the specific structure I have illustrated, since I have found generally that radiation caused in this manner can be effectively minimized by a practical low-cost, yet very effective, specific type of contact means which supplies electrical contact between the various portions of the multi-element shield.

Referring to Fig. 1, it can be seen that I provide a resilient contact finger 30 having one end held against chassis 11 and fastening means 18. In the actual embodiment built and tested, it was found that solder lugs had sufficiently low impedance and sufficient resiliency to act as a wiping type or short-circuit contact. A second and similar resilient finger contact member 31 is shown fastened between chassis 11 and chassis 14 by fastening means 19. The relative position of these resilient fingers can best be seen in Fig. 1; however, their wiping action against cover 17 can best be seen in Figs. 2 and 3. For example, in Fig. 2 the dotted outline of solder lug 31 shows its normal unstressed position which it assumes when cover 17 is removed. Then when cover 17 is brought into place, from the position shown in dot-dash outline in Fig. 1 to a closed position, the resilient finger member 31 is bent downwardly by the edge of the cover moving relative to finger member 31 in a selfcleaning or wiping action. As a result, a good electrical contact is made even though there be corrosion present on both members. Referring to Fig. 3, again the dotted line version of resilient finger member 30 illustrates the normal unstressed position of the finger member. Also, it can now be seen that, when cover 17 is fitted into place, the side edge of the cover is brought to bear against resilient finger member 30 setting up a wiping action as was explained above. These resilient finger members perform at least two functions. Directly, they comprise electrical conductors which reform otherwise disturbed eddy current paths in the shield structure so as to reduce radiation. Secondarily, they function to provide a force which can be used to insure good electrical contact at other joints in the multi-element shield, e. g., along seam 21.

The direct function controls the selection of the contact position and the secondary function controls in the selection of a force axis for the contact pressure. The contact position is critical and usually is selected by some form of radiation measurement test. This may be done by placing normal power on the unit to be shielded. With the multi-element shield unit mounted in place, the radiation pattern is first checked by some form of a field strength meter. Next, a low-impedance metallic object is used to bridge a small portion of the discontinuity to be corrected, such as gap 23 in Fig. 3. Then while noting the reading on the field strength meter, the piece of metal is slowly moved along the gap or discontinuity until the minimum radiation point is ascertained. If the unit to be shielded has an operating frequency bandwidth which is appreciable, tests such as this should be made at several different frequencies within the band width and if the minimum radiation point is ascertained to be different for each test frequency, it will be necessary either to supply a contact member for each frequency range checked or select a single point as a compromise.

After the contact point is ascertained, the secondary function of the resilient finger member should be considered and a satisfactory contact pressure force axis selected. Usually it will be convenient to form an overlap joint somewhere in the multi-element shield similar to seam 21 shown in Fig. 1. If so, the contact pressure force axis of the finger member should be selected so that the finger member not only is able to make contact against the shield element at the contact point determined by the radiation test but is also able to apply a force along an axis which will insure a satisfactory electrical contact along the overlapped or abutted joint. For mounting the member there is usually a supporting chassis bolt somewhere in the near vicinity of the selected contact point, which can be used as an anchoring point for one end of the resilient finger member. If not, one end of the resilient finger can be mounted near the selected contact point by loosening up a chassis bolt some distance away from the desired position and slipping the fixed end of the resilient finger between the chassis and shield surfaces. After the chassis bolt has been tightened, it can be seen that the finger member will be held in a fixed position. The spring end of the finger member is then distorted so as to contact the selected critical point on the shield member and also supply pressure along the selected force axis. The finger member, when so positioned, not only acts to form a new eddy current path between a high potential point on the shield surface and a low potential point on the chassis or other shield portions, but also, if the contact pressure force axis is correctly selected, the finger will act to insure a wiping contact along an overlapped joint in the shield structure.

In the illustrated embodiment, radiation measurement tests indicated that the gap 23 should be bridged at a point close to bolts 18 and 19. Therefore relatively short resilient finger means could be used. In order to take full advantage of the secondary function of the contacts, finger member 30 was distorted so as to bear firmly against the edge of cover 17 which bordered gap 23. Also it was found convenient to furnish a tongue member on the rear portion of cover 17 which fit into a slit on chassis 11 so as to form a hinge axis around which cover 17 could be partially rotated. Of course, other conventional means may be used at this point, and since the particular fastening means forms no part of my invention, it has not been shown in the drawings. As a result, when cover 17 is moved from its open position, into its closed position, resilient finger member 30 sets up a force along the proper axis to force a tight fit along seam 21. The contact advantage realized during assembly is retained by making the hole in cover 17, through which metal screw or bolt 20 is inserted, larger than the diameter of the metal screw. Thus when the metal screw is tightened, cover plate 17 remains in the position into which it was forced by the pressure of finger member 30 and thus the tight fit along seam 21 is retained. Resilient finger member 31 also has its secondary function in that it tends to force the upper surface of the cover 17 against the head of metal screw 20 by exerting pressure under the end of the cover, thus insuring a wiping action between the bottom of the screw head and the top surface of cover 17 while the metal screw is tightened. In the illustrated embodiment only metal screw 20 need be removed in order to take off cover 17. When the cover is replaced, it will be obvious to anyone assembling the unit that metal screw 20 or its equivalent must be replaced in order to keep cover 17 in place. As the cover is moved into position, resilient finger members 30 and 31 will wipe into place. Also, force is applied between the cover 17 and chassis 11 along seam 21. A good contact is made between the top part of cover 17 and metal screw 20. Compare this to the results realized when cover plate 17 is soldered into place or bolted into place. If solder is used, not only is the original production cost high but the service cost for removing it is high and in all probability a considerable number of discontinuities along the junction between cover 17 and chassis 11 would be allowed to develop. If these units had been bolted together, in all probability the units would have been reassembled during servicing by using only sufficient bolts to hold the cover in place without proper regard to electrical contact between the surfaces involved.

From this it seems apparent that soldered joints are too expensive and too difficult to maintain unless they are absolutely necessary. Also it seems apparent that there is too great a possibility that the radiation function of a bolt or bolts will be ignored during subsequent service operation, with excessive radiation resulting, thereby running afoul of present FCC rules.

Resilient contact fingers can be made very cheaply. Once the fingers are installed on the production line they can be expected to perform their intended functions even though the shield is often removed for service checking of the shielded units. The wiping action between the surfaces involved insures good electrical contact throughout the life of the unit being shielded. They can be used to make a force-fit between parts having loose allowed tolerances.

Thus it will be seen from the above description, that I have provided in a multi-element radiant energy shield structure the combination comprising a first electrically conductive shield portion 11, a second electrically conductive shield portion 17, said first and second shield portion being formed to provide complimentary abutting electrical contact surfaces along at least one common assembled edge 21, means 18 connecting said first shield portion to a mounting surface 14, electrically conductive resilient finger means 30 fixedly attached at one end to said first shield portion by said fastening means and shaped so as to wipe into contact with a selecting point on an edge of said second shield portion which would otherwise fail to contact said first shield portion, said selected point being a peak radiation potential point.

While there has been shown and described what at present is considered the preferred embodiment of the present invention, it will become obvious to those skilled in the art that various changes and modifications may be made therein without departing from the invention as defined by the appended claim.

Having thus described my invention, I claim:

A combination housing for a television receiver tuner comprising a first box-like metallic structure formed with an open face, a metallic closure member fitted to said face to form a complete enclosure, said closure member being apertured to provide a mounting, an insulating and lead-through board mounted on said closure member, an L-shaped, metallic chassis for supporting an R. F. generator and comprising a first integral portion disposed in parallel to and spaced from said closure member and cut away to expose said board and a second integral portion horizontally disposed at right angles to said closure member and terminating in a flange parallel to the first-mentioned portion, means including integral lugs formed in said chassis and a pair of boots for securing said chassis to said closure member, one of said lugs being formed by a bend integral with and at right angles to the horizontal portion of said chassis, the other of said lugs being formed integral with and offset from the first-mentioned portion of said chassis, said bolts projecting through said lugs to said closure member, a second box-like, metallic structure formed with adjacent open faces and two adjacent sides and two ends and adapted to be secured to the chassis so that the two portions of said chassis are adjacent to said faces and so that the margin of one of said sides abuts said flange, a pair of resilient contact fingers of conductive material, each generally L-shaped in formation, one of said fingers having a mounting portion secured by one of said bolts adjacent one of said lugs and a contact portion normally extending generally parallel to the horizontal chassis portion and contacting an end edge of said second box-like structure, the other of said lugs having a mounting portion secured by the other of said bolts adjacent said other of said lugs and a contact portion normally extending generally parallel to the other chassis portion and contacting an end edge of said second box-like structure normal to the first-mentioned edge, and means comprising a bolt and another integral lug formed on said chassis for securing said second box-like structure to said chassis, said conductive fingers electrically connecting said box-like structures at points normally rendered at high potential by said generator.

References Cited in the file of this patent

UNITED STATES PATENTS

| | | |
|---|---|---|
| 1,765,443 | Peterson | June 24, 1930 |
| 2,130,243 | Mitchell | Sept. 13, 1938 |
| 2,185,562 | Nielsen | Jan. 2, 1940 |
| 2,463,778 | Kellogg | Mar. 8, 1949 |
| 2,488,710 | Cooper | Nov. 22, 1949 |